United States Patent
Yuan

(10) Patent No.: US 12,189,903 B2
(45) Date of Patent: Jan. 7, 2025

(54) TOUCH FRAME ASSEMBLY AND INTERACTIVE WHITE BOARD

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Jiabin Yuan, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 17/994,240

(22) Filed: Nov. 25, 2022

(65) Prior Publication Data

US 2023/0087739 A1    Mar. 23, 2023

Related U.S. Application Data

(63) Continuation of application No. PCT/CN2020/142416, filed on Dec. 31, 2020.

(51) Int. Cl.
*G06F 3/042* (2006.01)
*G06F 3/041* (2006.01)

(52) U.S. Cl.
CPC ............ *G06F 3/042* (2013.01); *G06F 3/0412* (2013.01)

(58) Field of Classification Search
CPC ........ G06F 3/041; G06F 3/0412; G06F 3/042; G06F 3/0421; G06F 1/1601; G06F 1/1643; H05K 1/02
See application file for complete search history.

(56) References Cited

U.S. PATENT DOCUMENTS

2009/0322696 A1* 12/2009 Yaakoby ............. G06F 3/04164
156/60
2014/0354600 A1* 12/2014 Kuwata ............... G06F 3/03545
345/175

(Continued)

FOREIGN PATENT DOCUMENTS

| CN | 210038749 U | 2/2020 |
| CN | 210573710 U | 5/2020 |

(Continued)

OTHER PUBLICATIONS

International Search Report issued in corresponding international application No. PCT/CN2020/142416, dated Oct. 11, 2021, 4 pages.

*Primary Examiner* — Ryan A Lubit
(74) *Attorney, Agent, or Firm* — BAYES PLLC

(57) ABSTRACT

A touch frame assembly and an interactive white board are provided. The touch frame assembly includes: an infrared touch frame, including a frame body and a PCB assembly arranged in the frame body; a glass cover plate, located on an inner side of the PCB assembly; a fixing structure configured to fix the glass cover plate to the infrared touch frame, wherein the glass cover plate controls an inward concave of the glass cover plate through a curvature of the frame and/or the fixing structure.

18 Claims, 9 Drawing Sheets

(56) References Cited

U.S. PATENT DOCUMENTS

| | | | | |
|---|---|---|---|---|
| 2015/0277636 A1* | 10/2015 | Holmgren | ............. | G06F 3/0421 |
| | | | | 345/175 |
| 2015/0324045 A1* | 11/2015 | Chi | ...................... | G06F 3/0412 |
| | | | | 156/60 |
| 2016/0154533 A1* | 6/2016 | Eriksson | ................. | G06F 3/041 |
| | | | | 345/175 |
| 2017/0192596 A1* | 7/2017 | Lee | ....................... | G02F 1/1339 |
| 2019/0179192 A1* | 6/2019 | Lee | ....................... | G02B 6/009 |
| 2021/0103186 A1* | 4/2021 | Kwon | ............... | G02F 1/133602 |
| 2021/0263603 A1* | 8/2021 | Globerman | ......... | H05K 5/0017 |
| 2022/0113832 A1* | 4/2022 | Huang | .................. | G06F 3/0412 |

FOREIGN PATENT DOCUMENTS

| | | |
|---|---|---|
| CN | 210573725 U | 5/2020 |
| CN | 211826839 U | 10/2020 |

* cited by examiner

TOUCH FRAME ASSEMBLY AND INTERACTIVE WHITE BOARD

CROSS-REFERENCE TO RELATED APPLICATION

The present application is a continuation of International Application No. PCT/CN2020/142416, filed on Dec. 31, 2020. The entire content of the above-identified application is expressly incorporated herein by reference.

TECHNICAL FIELD

The present disclosure relates to the technical field of touch display devices, in particular to a touch frame assembly and an interactive white board.

BACKGROUND

At present, an infrared sensing height (writing height) of the touch frame assembly is generally greater than 3.5 mm, and even the infrared writing height of some products is greater than 4.5 mm. When the user is writing, the feeling of suspension is serious, resulting in poor writing experience. In order to continuously improve the user's writing experience, it is an inevitable development trend to continuously reduce the touch writing height. One of the major limitations of the infrared writing height is a control of inward concave of the glass cover plate.

Particularly, for large-sized touch panels, a deformation of the glass cover plate is more difficult to control. An installation structure of the existing glass cover plate cannot effectively control a convex of the glass cover plate. For display devices with low infrared writing height, once the convex of the glass cover plate occurs, infrared signals will be blocked, resulting in a failure of touch recognition. In the related art, the inward concave of the glass cover plate can only be realized by selecting the glass, which causes high loss of glass, low production efficiency and high cost.

SUMMARY

The present disclosure provides a touch frame assembly and an interactive white board in order to solve the problems of high loss of glass and high cost caused by controlling an inward concave of a glass cover plate by selecting glass in the related art.

An aspect of the present disclosure provides a touch frame assembly. The touch frame assembly includes: an infrared touch frame, including a frame body and a PCB assembly arranged in the frame body; a glass cover plate, located on an inner side of the PCB assembly; a fixing structure, used for fixing the glass cover plate to the infrared touch frame. The glass cover plate controls an inward concave of the glass cover plate through a curvature of the frame and/or the fixing structure.

Another aspect of the present disclosure provides an interactive white board, including a backlight module and the touch frame assembly provided above.

According to the technical solution of the present disclosure, the touch frame assembly includes an infrared touch frame, a glass cover plate and a fixing structure. After the glass cover plate is fixedly mounted on the frame body with the fixing structure, the glass cover plate will control the glass cover plate to be recessed inward through the curvature of the frame body and/or the fixing structure, so as to prevent the glass cover plate from blocking infrared signal transmission of the PCB assembly due to the convex during use, thereby ensuring a normal infrared touch operation. In addition, for the display device with the above structure, it does not need to control the inward concave of the glass cover plate by selecting glass, which can reduce the loss of glass, thereby improving the production efficiency and reducing the production cost.

BRIEF DESCRIPTION OF DRAWINGS

The drawings which consists a part of the present disclosure are used to provide a further understanding of the present disclosure. The schematic embodiments of the present disclosure and their descriptions are used to explain the present disclosure and do not constitute an improper limitation of the present disclosure. In the drawings.

Figure 1:
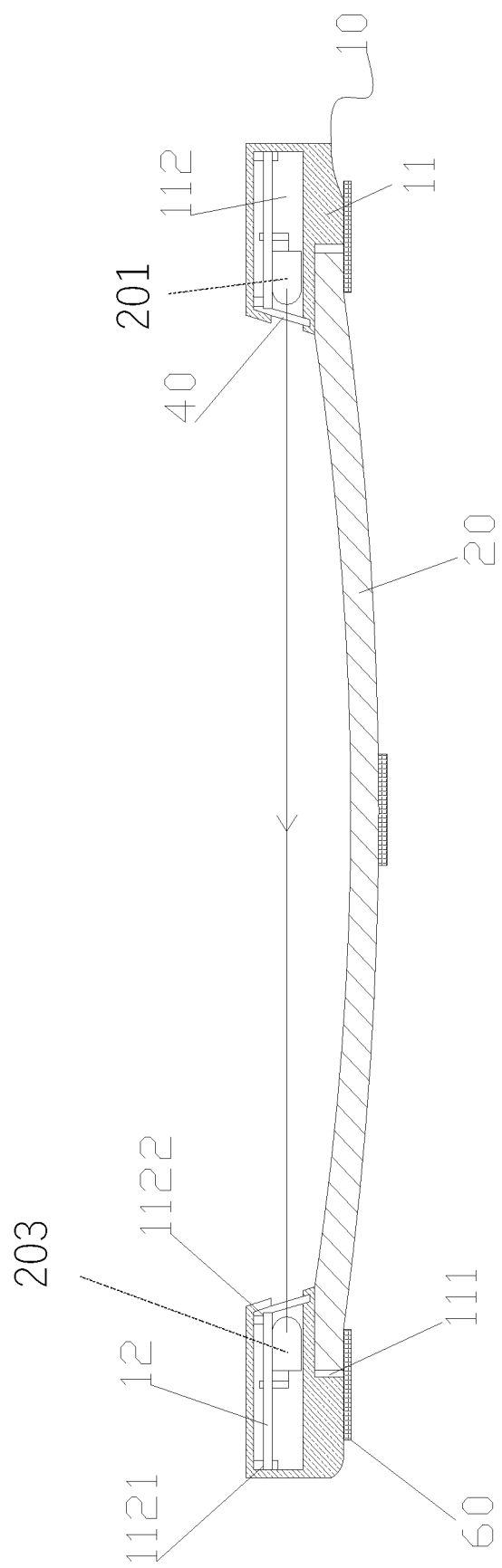
FIG. 1 shows a cross-sectional view of a touch frame assembly according to Embodiment 1 of the present disclosure.

Therein, the above figures include the following reference numerals:

10, Infrared Touch Frame; 11, Frame Body; 111, First Step; 112, First Mounting Groove; 1121, Slot; 1122, Second Step; 12, PCB Assembly; 20, Glass Cover Plate; 31, Inward concave Surface; 32, Support Pad; 40, Filter Bar; 60, Fixing Piece.

DETAILED DESCRIPTION

Hereinafter, the technical solutions in the embodiments of the present disclosure will be described in combination with the drawings in the embodiments of the present disclosure. Definitely, the described embodiments are only a part of the embodiments of the present disclosure, not all of the embodiments. The following description of at least one exemplary embodiment in face merely illustrative, which does not serve as any limitation on the present disclosure and its application or use. Based on the embodiments of the present disclosure, all other embodiments obtained by those skilled in the art without making creative labor shall fall within the claimed scope of the present disclosure.

Figure 2:
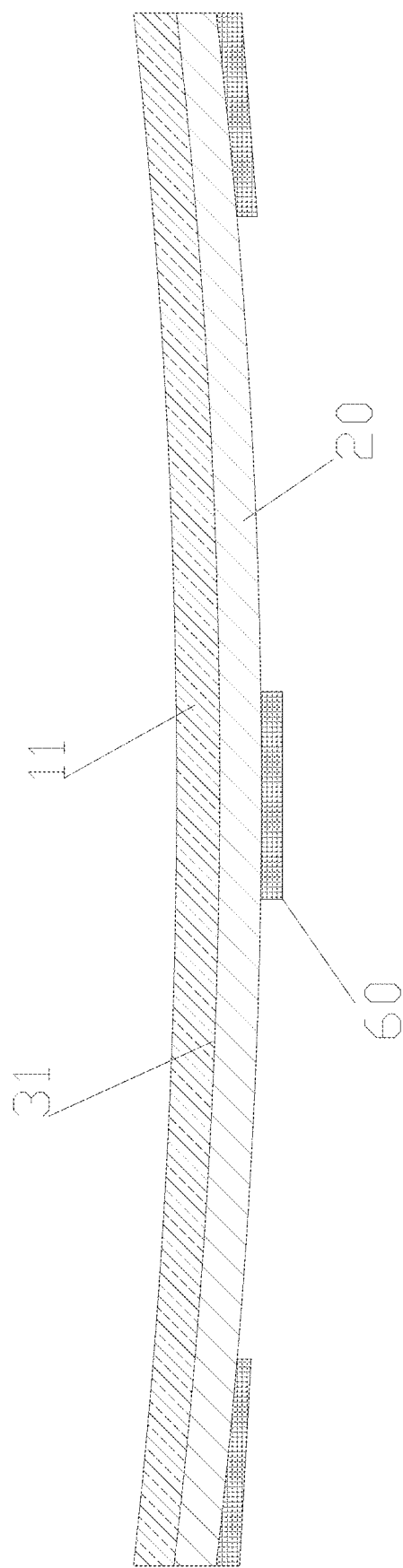
FIG. 2 shows another cross-sectional view of a touch frame assembly provided according to Embodiment 1 of the present disclosure.

As shown in FIGS. 1 and 2, Embodiment 1 of the present disclosure provides a touch frame assembly. This touch frame assembly includes an infrared touch frame 10, a glass cover plate 20 and a fixing structure. The infrared touch frame 10 includes a frame body 11 and a PCB assembly 12 arranged in the frame body 11. The glass cover plate 20 is located on an inner side of the PCB assembly 12. A touch operation can be performed by touching the glass cover plate 20. The glass cover plate 20 can be fixed to the frame body 11 by the fixing structure provided between the frame body 11 and the glass cover plate 20. An inward concave of the glass cover plate 20 can be controlled by the curvature of the frame body 11 and the fixing structure.

By applying the touch frame assembly provided in this embodiment, after the glass cover plate 20 is fixed on the frame body 11 through the fixing structure, the inward concave of the glass cover plate 20 can be controlled by the curvature of the frame body 11 and the fixing structure, so as to prevent the glass cover plate 20 from blocking infrared signal transmission of the PCB assembly 12 due to the convex during use, thereby ensuring a normal operation of infrared touch. In addition, by adopting the display device with the above structure, such as the interactive white board, it is not necessary to control the inward concave of the glass cover plate 20 by selecting glass, which can reduce the loss of glass, thereby improving the production efficiency, simplifying the structure and reducing the low cost.

In this embodiment, the frame body, as the frame of the display device, is formed by bending, which can be machined in various forms, such as rolling, so that the frame body 11 forms an inward concave surface and is recessed inward, and the thickness of the frame body 11 is kept consistent. As shown in FIG. 2, the thickness of the frame body 11 is kept consistent. In this embodiment, the backlight module is located inside the display device, the PCB assembly 12 is installed in the frame body 11, and the glass cover plate 20 is located on the inner side of the PCB assembly 12. It should be noted that the frame body 11 is provided with a PCB assembly 12. The PCB assembly 12 is provided with an infrared emission tube 201 and an infrared receiving tube 203. Infrared rays emitted by the infrared emission tube 201 are received by the infrared receiving tube 203, and an infrared matrix crossing vertically and horizontally is formed above the glass cover plate. When the user touches the screen, a controller determines a specific position of the contact point on the screen, thereby completing the infrared touch operation.

As shown in FIGS. 1 and 2, the glass cover plate 20 is located on the inner side of the PCB assembly 12. Since the frame body 11 is bent inward, after the glass cover plate 20 is fixedly mounted on the frame body 11, the glass cover plate 20 will be recessed inward due to the attachment of the glass cover plate 20 to the bent frame body 11. In some implementations, the frame body 11 forms an inward concave arc-surface. When the glass cover plate 20 is fixedly connected with the frame body 11, the glass cover plate 20 deforms along with the inward concave of the frame body 11 to achieve the inward concave of the glass cover plate 20. Then, the glass cover plate 20 is fixed on the frame body through the fixing piece 60 to maintain the inward concave of the glass cover plate 20, so as to prevent the glass cover plate 20 from blocking infrared signals emitted by the PCB assembly 12 due to the convex during use. As shown in FIG. 1, a direction of the arrow in the figure indicates infrared signal transmission. At this time, the glass cover plate 20 is recessed inward, and the signal is normally transmitted, thereby ensuring the normal operation of the infrared touch.

As shown in FIG. 2, in this embodiment, the frame body 11 is provided with an inward concave surface 31 for connecting the glass cover plate 20. The inward concave surface 31 is recessed toward a side of the frame body 11 facing away from the PCB assembly 12. A part of the surface of the glass cover plate 20 is attached to the inward concave surface 31. When the fixing structure fixes the glass cover plate 20 to the infrared touch frame, the glass cover plate 20 is kept in an inward concave state. The glass cover plate 20 mounted on the frame body 11 is recessed inward by a molding operation on the whole frame body 11, which is simple in structure and low in cost.

In some implementations, the side of the frame body 11 facing away from the PCB assembly 12 is bent to form a depression, and the glass cover plate 20 is fixedly mounted on the frame body 11 so that the glass cover plate 20 is recessed inward. That is, the frame body 11 forms an inward concave surface 31 which is recessed inward. In some implementations, when the glass cover plate 20 is fixedly connected in the frame body 11, the glass cover plate 20 deforms with the depression of the frame body 11 to achieve the concave of the glass cover plate 20, thereby preventing the glass cover plate 20 from blocking the infrared signal transmission of the PCB assembly 12 due to the convex during use, and thus ensuring the normal infrared touch operation.

In this embodiment, the inward concave surface 31 is an arc-shaped concave surface. The adoption of the arc-shaped concave structure facilitates the deformation of the glass cover plate 20 by using the arc-shaped concave surface.

In this embodiment, the arc-shaped concave surface has a symmetrical structure, and the glass cover plate 20 can be symmetrically depressed, so that the inward concave of the glass cover plate 20 is more stable. Preferably, a highest point of the arc-shaped concave surface is arranged corresponding to both ends of the glass cover plate 20, a lowest point of the arc-shaped concave surface is arranged corresponding to a middle point of a long edge of the glass cover plate 20, the highest point of the arc-shaped concave surface is arranged corresponding to both ends of the frame body 11, and the lowest point of the arc-shaped concave surface is arranged corresponding to a middle point of a long edge of the frame body 11, so that the glass cover plate 20 can achieve uniform depression, which prevents the glass cover plate 20 from a fracture due to excessive deformation of local depression. In addition, since a length of the long edge of the glass cover plate 20 is large, it is easy to bend the glass cover plate 20 from the middle portion to the inner side, so as to achieve the inward concave of the glass cover plate 20, which is an optional scheme.

In this embodiment, a height difference between the highest point of the arc-shaped concave surface and the lowest point of the arc-shaped concave surface is H, and H has a value range of 0.5 mm-5 mm. It should be pointed out that when the value of H is too small, the bending of the glass cover plate 20 is not obvious. At this time, when the glass cover plate 20 is convex, it is easy to cause that the infrared signal is unable to be transmitted normally. When the value of H is too large, it is easy to cause fracture of the glass cover plate 20. Therefore, the above value range of H is optional.

In this embodiment, the outer contour of the glass cover plate 20 is rectangular, and the long edge of the glass cover plate 20 is connected with the inward concave surface 31, so that the glass cover plate 20 can be easily deformed.

In this embodiment, the frame body 11 is a curved profile by rolling, that is, the frame body 11 is rolled to form an inner concave arc-surface, which is easy to process and low in cost. Therein, the thickness of the frame body 11 is kept consistent.

Figure 6:
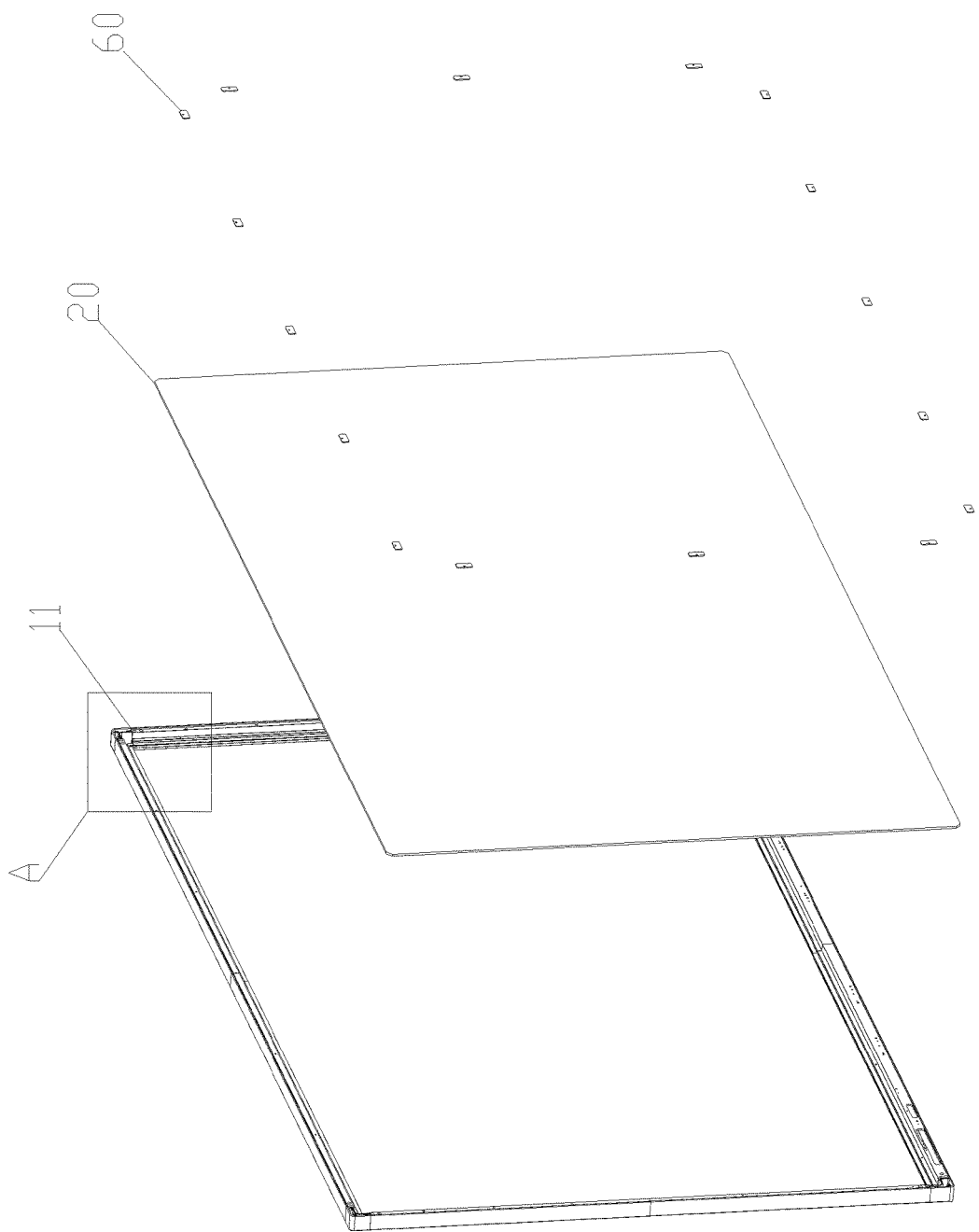
FIG. 6 shows an exploded view of a touch frame assembly provided according to Embodiment 1 of the present disclosure.
Figure 7:
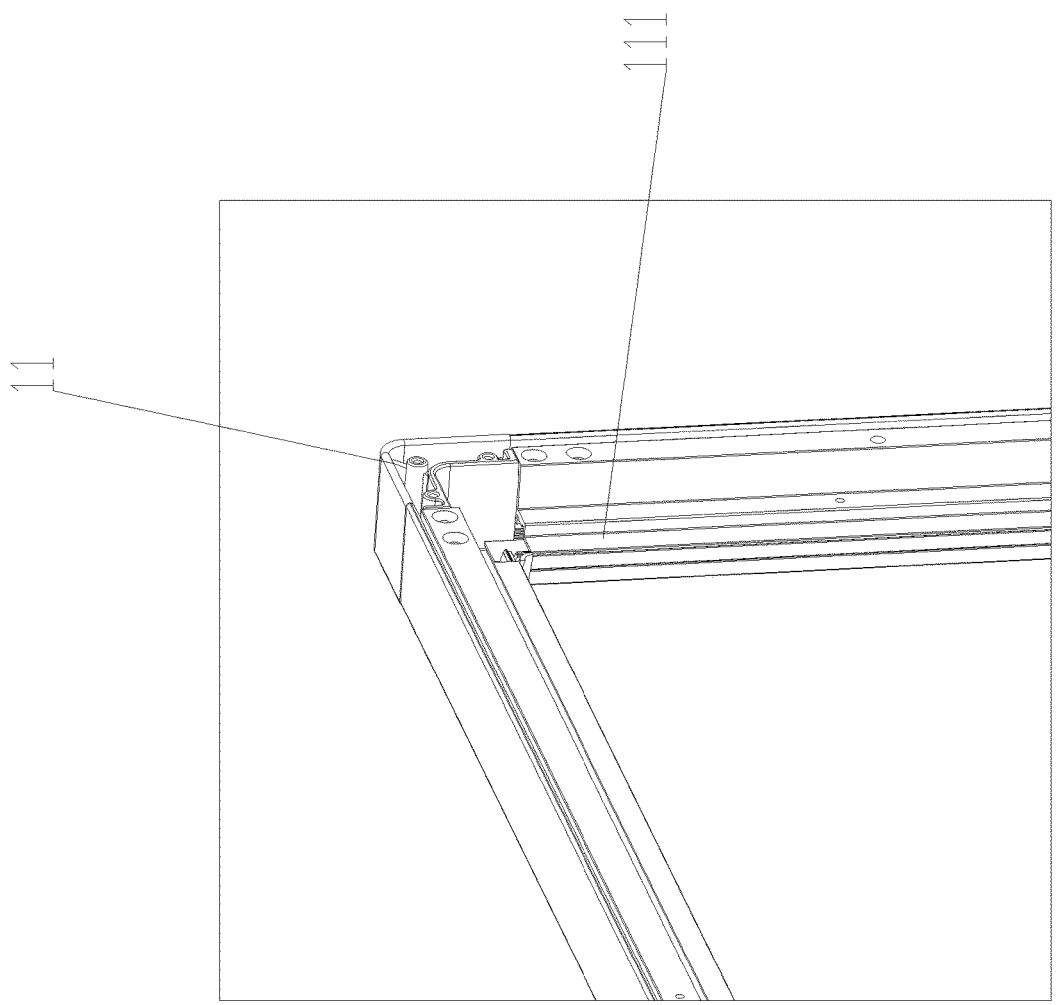
FIG. 7 shows a partial enlarged view at A in FIG. 6.
Figure 8:
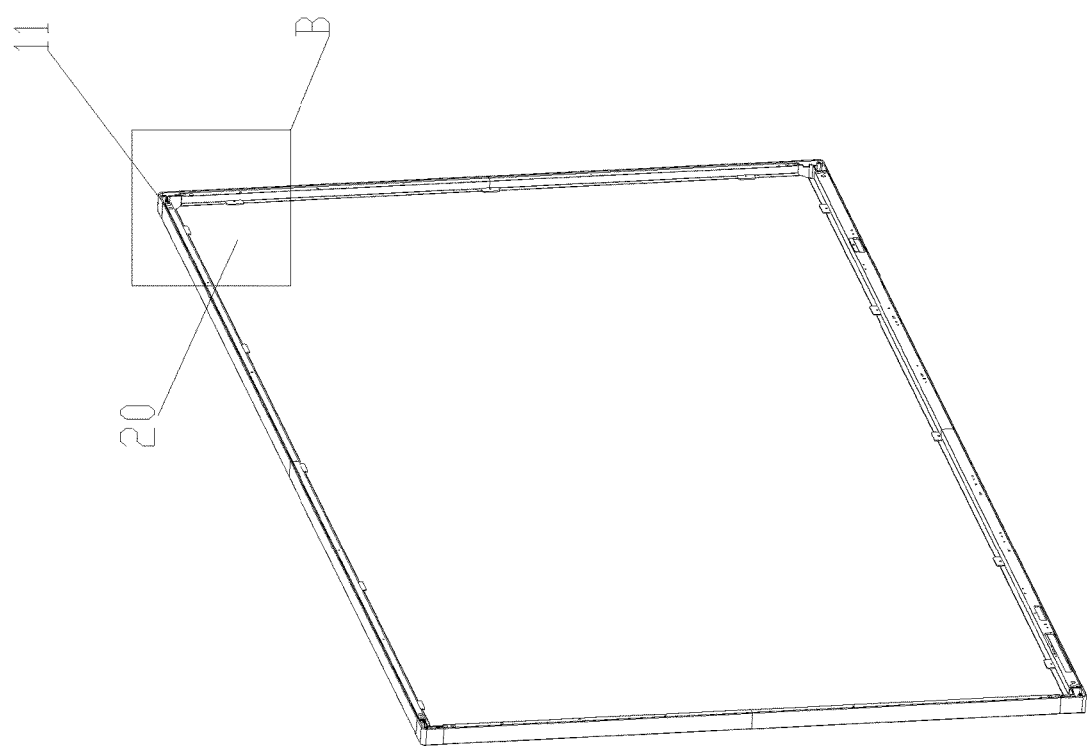
FIG. 8 shows an assembly diagram of a touch frame assembly according to Embodiment 1 of the present disclosure.
Figure 9:
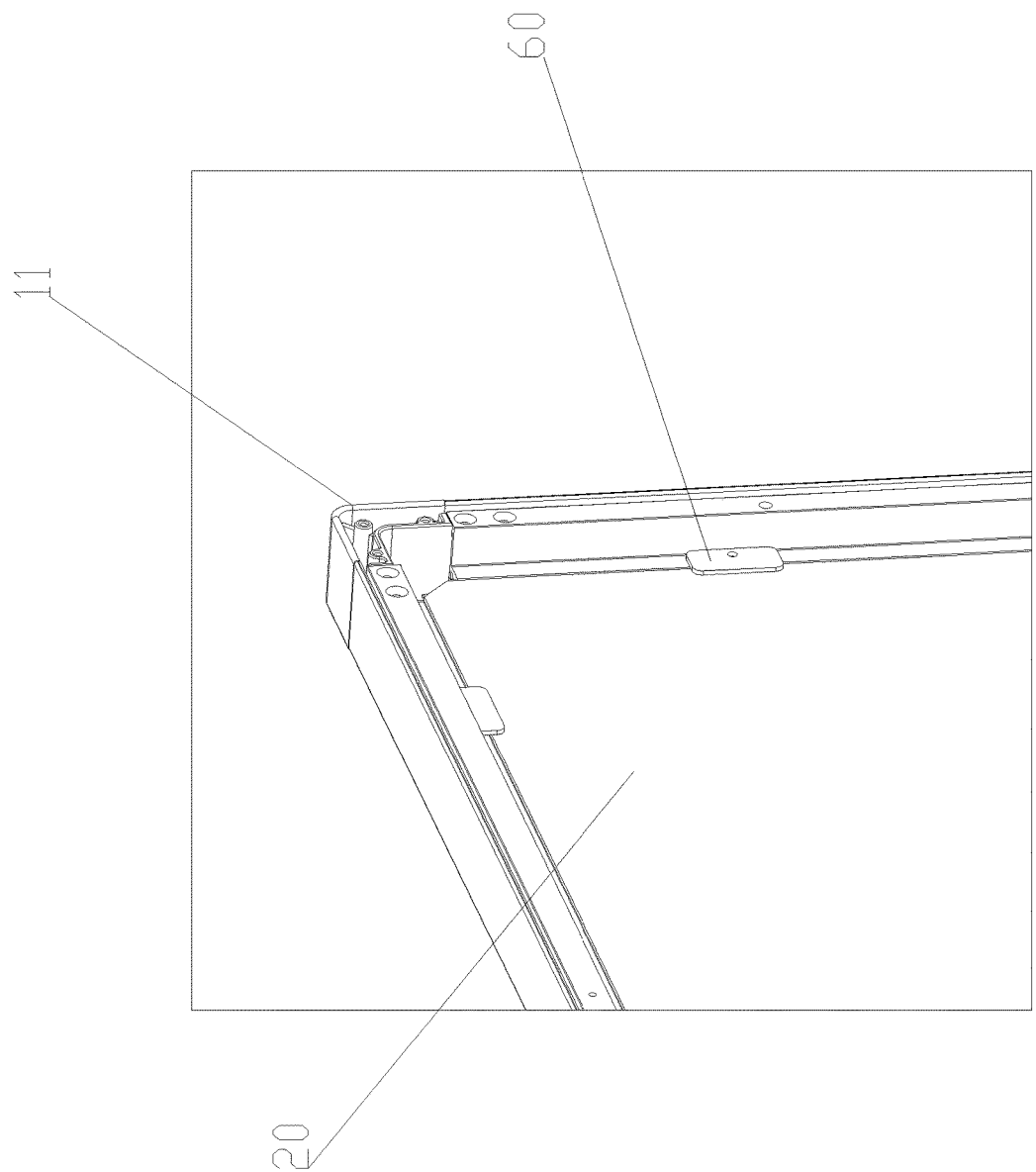
FIG. 9 shows a partial enlarged view at B in FIG. 8.

As shown in FIGS. 1, 6 and 7, the frame body 11 is provided with a first step 111 for supporting the glass cover plate 20. A part of the surface of the glass cover plate 20 is abutted against the step surface of the first step 111, and the end of the glass cover plate 20 is supported by the first step 111. The above structure makes the installation of the glass cover plate 20 more convenient and the abutting more stable. After the glass cover plate 20 is placed in the first step 111, the glass cover plate 20 is fixed through the fixing structure, which can prevent the glass cover plate 20 from slipping, and the first step 111 has a positioning function to facilitate the installation of the glass cover plate 20. In FIG. 1, there is a gap between the end of the glass cover plate 20 and the first step 111. Since there is a machining error in the machining process of each component, the glass cover plate 20 can be smoothly installed into the frame body 11 by arranging the gap.

In some implementations, the inward concave surface 31 is provided on the step surface of the first step 111. After the glass cover plate 20 is placed in the first step 111, the inward concave of the glass cover plate 20 can be realized while using the first step 111 for positioning.

As shown in FIGS. 1, 2, 8 and 9, in this embodiment, the display device further includes a plurality of fixing pieces 60. Each fixing piece 60 is respectively connected with the inner surface of the glass cover plate 20 and the frame body 11, whereby the fixing pieces 60 fix the inner surface of the glass cover plate 20 and the frame body 11, so that the glass cover plate 20 is firmly fixed in the frame body 11.

In some implementations, a first end of the fixing piece 60 is connected with the frame body 11 through screws, a second end of the fixing piece 60 is located above the first step 111, and the second end of the fixing piece 60 is pressed on the glass cover plate 20, so as to firmly fix the glass cover plate 20 in the frame body 11.

In this embodiment, the fixing pieces 60 are glass pressing blocks, and each glass pressing block is evenly distributed along the length direction of the glass cover plate 20, so that the glass cover plate 20 is stably fixed on the frame body 11. It should be noted that the glass pressing blocks can also be provided on a short edge of the glass cover plate 20, but the length of the long edge of the glass cover plate 20 is long, and the stable connection of the glass cover plate 20 can be better achieved by providing the glass pressing block on the long edge. When the glass cover plate 20 is mounted, the glass pressing block is locked by a locking screw, so that the glass cover plate 20 is recessed inward and fixed to the frame body 11.

In some embodiments, the glass cover plate 20 may be bonded to the inward concave surface 31. That is, the glass cover plate 20 is adhered in the frame body 11 with double-sided adhesive or liquid adhesive, so as to realize the fixed connection between the glass cover plate 20 and the frame body 11.

In some embodiments, the frame body 11 includes a first mounting groove 112, and the PCB assembly 12 is arranged in the first mounting groove 112, thereby facilitating installation and protection of the PCB assembly 12.

In some implementations, a wall of the first mounting groove 112 is provided with a slot 1121 and a second step 1122. One end of the PCB assembly 12 is clamped with the slot 1121, and the other end of the PCB assembly 12 is bonded with a step surface of the second step 1122, so that the PCB assembly 12 is stably arranged in the first mounting groove 112, thereby avoiding shaking of the PCB assembly 12, and ensuring a normal operation of the touch operation.

In addition, the touch frame assembly further includes a filter bar 40. In order to make the filter bar 40 be stably connected, the filter bar 40 is mounted on a notch of the first mounting groove 112.

By adopting the touch frame assembly of Embodiment 1, a side of the frame body 11 facing away from the PCB assembly 12 is bent to form a depression, and the glass cover plate 20 is fixedly mounted on the frame body 11 so that the glass cover plate 20 is recessed inward. In some implementations, since the frame body 11 is fixed by a backlight module of the display device, when the glass cover plate 20 is fixedly connected in the frame body 11, the glass cover plate 20 deforms along with the depression of the frame body 11 to realize the inward concave of the glass cover plate 20, so as to prevent the glass cover plate 20 from blocking the infrared signal transmission of the PCB assembly 12 due to the convex during use, thereby ensuring a normal infrared touch operation. In addition, for the display device with the above structure, it does not need to control the inward concave of the glass cover plate 20 by selecting glass, which reduces the loss of glass and improves the production efficiency. Moreover, the glass cover plate 20 mounted on the frame body 11 is recessed inward by the molding operation on the whole frame body 11, which is simple in structure and low in cost.

Figure 3:
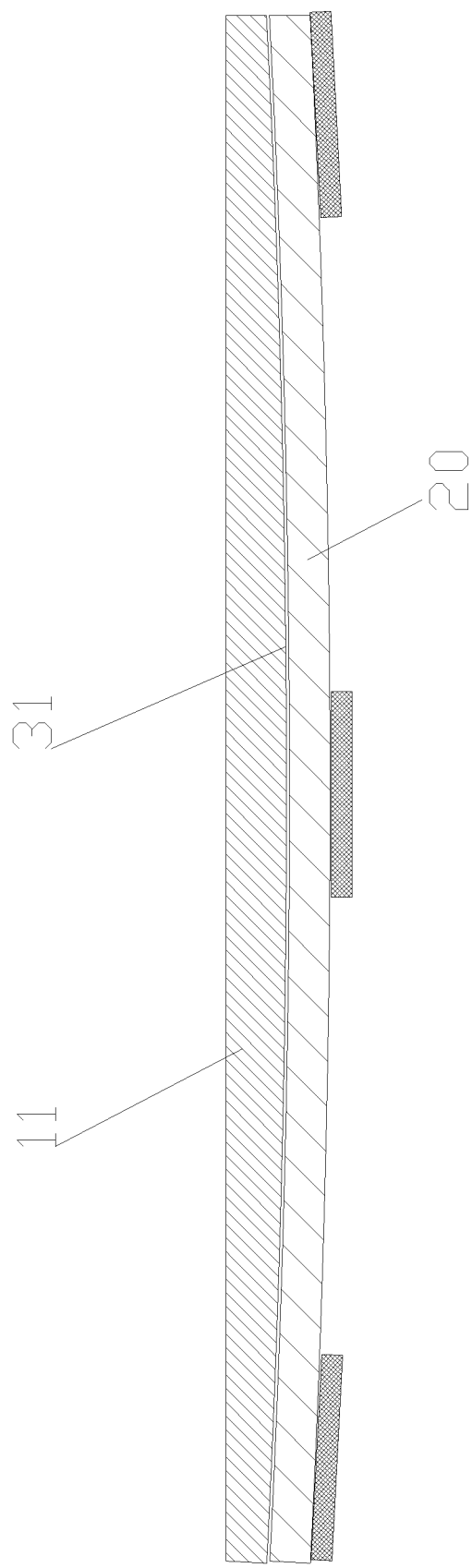
FIG. 3 shows a cross-sectional view of a touch frame assembly according to Embodiment 2 of the present disclosure.

As shown in FIG. 3, Embodiment 2 of the present disclosure provides a touch frame assembly. The difference between Embodiment 2 and Embodiment 1 is that in Embodiment 2, the thickness of the middle portion of the frame body 11 is greater than that of both ends of the frame body 11, so as to form the inward concave surface 31.

In this embodiment, the frame body 11 is provided with a machined surface for connecting the glass cover plate 20. The machined surface is an inward concave surface 31, which can be obtained by machining. The inward concave surface 31 can be an arc-shaped concave surface or a surface having step differences, so that the machined surface can be gradually depressed along its two ends to the middle. The surface of the glass cover plate 20 is attached to the inward concave surface 31. At this time, the glass cover plate 20 is closely attached to the inward concave surface 31, and the glass cover plate 20 is connected and fixed on the frame body 11 through the fixing piece, so that the glass cover plate 20 is bent inward, which makes the glass cover plate 20 to be recessed inward, thereby preventing the glass cover plate 20 from blocking the infrared signal emitted by the PCB assembly 12 due to its convex during use.

In this embodiment, the glass cover plate 20 is connected and fixed on the frame body 11 by a fixing piece, which is the same as the scheme in Embodiment 1, and will not be described herein.

By applying the touch frame assembly provided in this embodiment, the glass cover plate 20 is attached to the inward concave surface 31, so that the glass cover plate 20 is recessed inward, thereby preventing the glass cover plate 20 from blocking the infrared signal transmission of the PCB assembly 12 due to the convex during use, and thus ensuring the normal infrared touch operation. In addition, for the display device with the above structure, it only needs to machine the inward concave surface 31 on the frame body 11, and does not need to select glass to control the inward concave of the glass cover plate 20, which can reduce the loss of glass and improve the production efficiency. Moreover, the machining cost of the inward concave surface 31 is low and the inward concave of the glass cover plate 20 is realized, and thus the structure is simple and the cost is low.

In this embodiment, the thickness of the middle portion of the frame body 11 is greater than that of both ends of the frame body 11, that is, the inward concave surface 31 is formed by cutting both ends of the frame body 11, thereby making the machining of the inward concave surface 31 of the frame body more convenient. The outer contour of the glass cover plate 20 is rectangular, the long edge of the glass cover plate 20 is connected with the inward concave surface 31, and the length of the long edge of the glass cover plate 20 is large. Therefore, when the long edge of the glass cover plate 20 is connected with the inward concave surface 31, it is easy to make the glass cover plate 20 recess inward from the middle portion.

In some implementations, the inward concave surface 31 is an arc-shaped concave surface, and the arc-shaped concave surface has a symmetrical structure, so that the glass cover plate 20 can be symmetrically recessed, which makes the glass cover plate 20 generate uniform concave deformation. The highest point of the arc-shaped concave surface is arranged corresponding to both ends of the glass cover plate 20, that is, the highest point of the arc-shaped concave surface is two ends of the frame body 11, or near the two ends of the frame body 11. The lowest point of the arc-shaped concave surface is arranged corresponding to the midpoint of the long edge of the glass cover plate 20, that is, the lowest point of the arc-shaped concave surface is the midpoint of the frame body 11 or near the midpoint of the frame body 11, which further makes the glass cover plate 20 achieve uniform depression, and prevents the glass cover plate 20 from fracture due to excessive deformation of local depression.

In some implementations, a height difference between the highest point of the arc-shaped concave surface and the lowest point of the arc-shaped concave surface is H, and H has a value range of 0.5 mm-5 mm. It should be pointed out that when the value of H is too small, the bending of the glass cover plate 20 is not obvious. At this time, when the glass cover plate 20 is convex, it is easy to cause that the infrared signal is unable to be transmitted normally. When the value of H is too large, it is easy to cause fracture of the glass cover plate 20. Therefore, the above value range of H is optional.

By adopting the touch frame assembly of Embodiment 2, the frame body 11 is provided with a machined surface for connecting the glass cover plate 20. The machined surface is an inward concave surface 31, and the inward concave surface 31 is recessed inward. A back surface of the glass cover plate 20 is attached to the inward concave surface 31. By fixedly connecting the glass cover plate 20 with the frame body 11 through a fixing piece, the glass cover plate 20 is recessed inward, so as to prevent the glass cover plate 20 from blocking the infrared signal transmission of the PCB assembly 12 due to the convex during use, thereby ensuring a normal infrared touch operation. In addition, by adopting the display device with the above structure, it is only necessary to machine the frame body 11 to get the inward concave surface 31, without selecting glass to control the concave of the glass cover plate 20, which reduces the loss of glass and improves the production efficiency. Moreover, the machining cost of the inward concave surface 31 is low and the inward concave of the glass cover plate 20 is realized, and the structure is simple and the cost is low.

Figure 4:
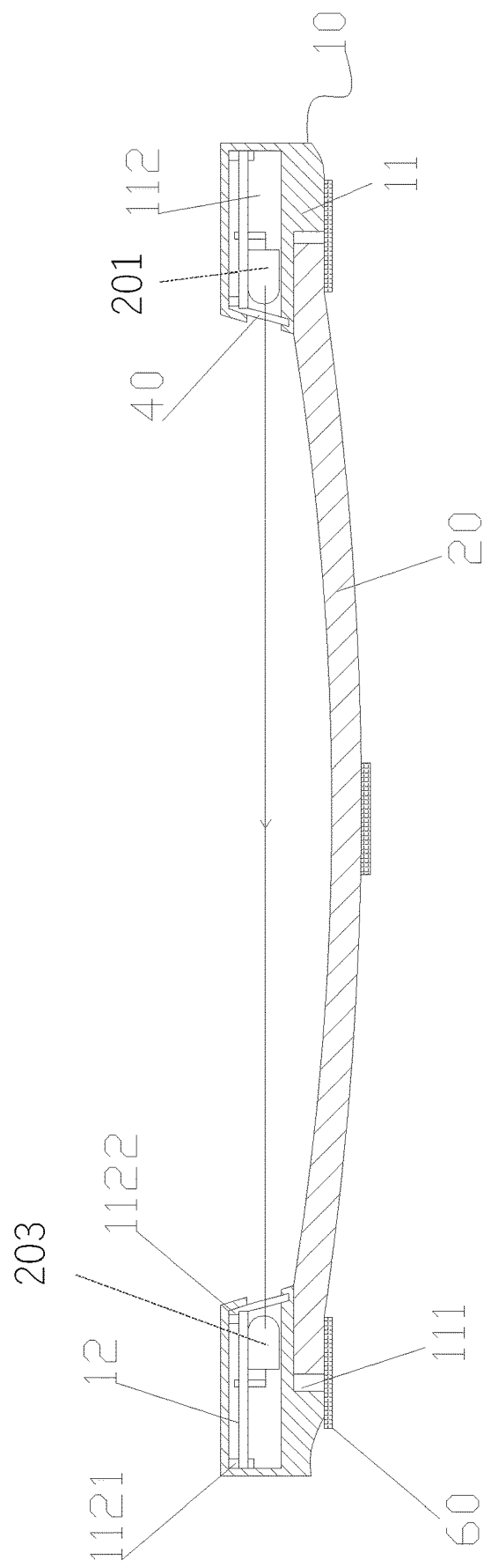
FIG. 4 shows a cross-sectional view of a touch frame assembly according to Embodiment 3 of the present disclosure.
Figure 5:
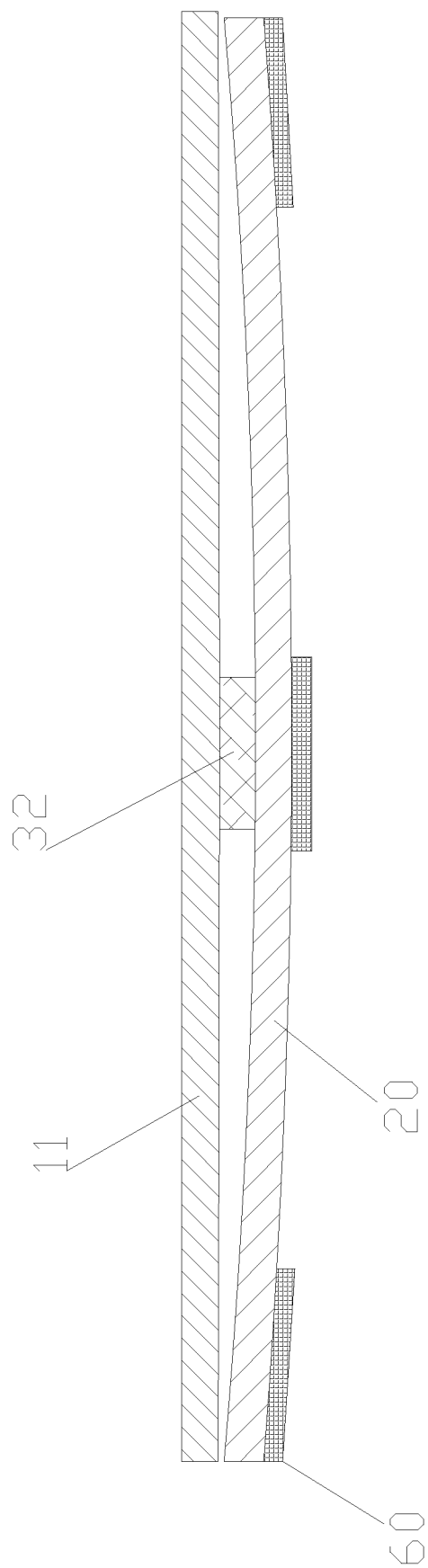
FIG. 5 shows another cross-sectional view of the touch frame assembly according to Embodiment 3 of the present disclosure.

As shown in FIGS. 4 and 5, Embodiment 3 of the present disclosure provides a touch frame assembly. The difference between Embodiment 3 and Embodiment 1 is that in Embodiment 3, a support pad 32 is provided between the glass cover plate 20 and the frame body 11. The support pad 32 generates a force causing the glass cover plate 20 recess inward, so that the glass cover plate 20 recesses inward.

In this embodiment, the outer surface of the glass cover plate 20 faces the outer side of the display device. It should be pointed out that the PCB assembly 12 is provided with one-to-one corresponding infrared emission tubes 201 and infrared receiving tubes 203, so that an infrared matrix crossing vertically and horizontally is formed on the screen. When the user touches the screen, the controller determines the specific position of the contact point on the screen, thereby achieving the infrared touch operation.

As shown in FIGS. 4 and 5, the PCB assembly 12 is installed in the frame body 11, and the glass cover plate 20 is located on the inner side of the PCB assembly 12, that is, the infrared ray emitted by the infrared emission tube 201 is located above the outer surface of the glass cover plate 20, and both ends of the glass cover plate 20 are fixedly connected in the frame body 11. Since both ends of the glass cover plate 20 are fixedly connected with the frame body 11, by arranging the support pad 32 between the frame body 11 and the glass cover plate 20, the glass cover plate 20 will be deformed under the support of the support pad 32, so that the glass cover plate 20 is recessed inward.

In this embodiment, the fixing structure includes a fixing piece 60, and both ends of the fixing piece 60 are respectively connected to the inner surfaces of the glass cover plate 20 and the frame body 11. In some implementations, both ends of the glass cover plate 20 are fixed to the frame body 11 through the glass pressing block, and the support pad 32 forms a fulcrum. The glass cover plate 20 is extruded by the support pad 32, so that the glass cover plate 20 is recessed inward, so as to prevent the glass cover plate 20 from blocking the infrared signals sent by the PCB assembly 12 due to the convex during use. As shown in FIG. 4, a direction of the arrow in the figure indicates the infrared signal transmission. At this time, the glass cover plate 20 is recessed inward, and the signal is normally transmitted, thereby ensuring normal infrared touch operation. In addition, by adopting the display device with the above structure, it is not necessary to select glass to control the concave of the glass cover plate 20, which reduces the loss of glass and improves the production efficiency. Moreover, the support pad 32 realizes the concave of the glass cover plate 20, which is simple in structure and low in cost.

In this embodiment, the outer contour of the glass cover plate 20 is rectangular, and a support pad 32 is arranged at the midpoint of the long edge of the glass cover plate 20. Since the length of the long edge of the glass cover plate 20 is large, it is easy to make the glass cover plate 20 recess inward from the middle portion, and make the glass cover plate 20 bend symmetrically, which is not easy to cause fracture of the glass cover plate 20. It should be pointed out that the support pad 32 may also be provided on the short edge of the glass cover plate 20, but the bending effect of the glass cover plate 20 is not good enough and the inward-concave degree of the glass cover plate 20 is not enough.

In some embodiments, a plurality of support pads 32 may be provided, and the plurality of support pads 32 may be evenly spaced.

In some implementations, the support pad 32 is in the form of a block, and the ratio of the length of the support pad 32 to the length of the long edge of the glass cover plate 20 is a, wherein a value of a has a range of 1/8 to 1/12; the ratio of the thickness of the support pad 32 to the thickness of the glass cover plate 20 is b, wherein a value of b has a range of 1/3 to 1/4. It should be pointed out that if the length of the support pad 32 is too small, the glass cover plate 20 will be easily fractured due to partial extrusion; if the length of the support pad 32 is too long, the contact with the glass cover plate 20 will not be sufficient when the glass cover plate 20 is extruded, and the bending effect of the glass cover plate 20 will not be obvious. If the thickness of the support pad 32 is too small, the bending and inward concave of the glass cover plate 20 is not obvious; if the thickness of the support pad 32 is too large, the glass cover plate 20 is easily fractured. Therefore, a and b in the above value range are optional.

In this embodiment, the support pad 32 is adhered to the frame body 11, so that the support pad 32 and the frame body 11 are stably connected. In other embodiments, the support pad 32 may also be fixed to the frame body 11 by other means such as fasteners, but it is more convenient and firmer to adopt the form of adhesion.

In this embodiment, the material of the support pad 32 is plastic or foam, so that the glass cover plate 20 is not easily damaged when the glass cover plate 20 is extruded, thereby improving the stability of the structure.

When installing the glass cover plate 20, firstly, the glass pressing blocks at both ends of the glass cover plate 20 are extruded. At this time, the support pad 32 in the middle portion of the glass cover plate 20 is extruded to bend the glass cover plate 20. Then, the glass pressing blocks in the middle portion of the glass cover plate 20 are locked, so that the glass cover plate 20 is recessed inward and fixed on the frame body 11.

By adopting the touch frame assembly of Embodiment 3, both ends of the glass cover plate 20 are fixed to the frame body 11, and the glass cover plate 20 is extruded by the support pad 32, so that the glass cover plate 20 is recessed inward, thereby preventing the glass cover plate 20 from blocking the infrared signal transmission of the PCB assembly 12 due to the convex during use, and thus ensuring a normal infrared touch operation. In addition, by adopting the display device with the above structure, it is necessary to select glass to control the concave of the glass cover plate 20, which reduces the loss of glass and improves the production efficiency. Moreover, the support pad 32 realizes the inward concave of the glass cover plate 20, which is simple in structure and low in cost.

Embodiment 4 of the present disclosure provides an interactive white board, including a backlight module and the touch frame assembly provided above. The backlight module is arranged on the inner side of the touch frame assembly.

It should be noted that the terms used herein are only for describing embodiments and are not intended to limit exemplary embodiments according to the present disclosure. As used herein, the singular form is also intended to include the plural form unless the context otherwise expressly indicates, and it should also be understood that when the terms "comprise" and/or "include" are used in this description, they indicate the presence of features, steps, operations, elements, components, and/or combinations thereof.

Unless otherwise specified, the relative arrangement of components and steps, numerical expressions and numerical values set forth in these embodiments do not limit the scope of the present disclosure. At the same time, it should be understood that, for convenience of description, the dimensions of each part shown in the drawings are not drawn according to the actual scale relationship. The technologies, methods and devices known to those skilled in the art may not be discussed in detail, but in appropriate cases, the technologies, methods and devices shall be regarded as a part of the authorization described. In all the examples shown and discussed herein, any specific value should be interpreted as merely exemplary and not as a limitation. Therefore, other examples of the exemplary embodiments may have different values. It should be noted that similar reference numerals and letters indicate similar items in the following drawings. Therefore, once an item is defined in one drawing, it is not necessary to be further discussed in the following drawings.

In the description of the present disclosure, it should be understood that the orientation or positional relationship indicated by the orientation terms such as "front, rear, up, down, left, right," "transverse, vertical, perpendicular, horizontal," and "top, bottom" are generally based on the orientation or positional relationship shown in the drawings, which is only for the convenience of describing the present disclosure and simplifying the description. Without any contrary description, these orientation terms do not indicate and imply that the device or element referred to must have a specific orientation or be constructed and operated in a specific orientation, and therefore cannot be understood as limiting the claimed scope of the present disclosure. The orientation terms such as "inside, outside" refer to the inside and outside of the contour of each component itself.

For convenience of description, spatial terms, such as "on," "above," "on the upper surface," "over," etc., can be used herein to describe the spatial positional relationship between one element or feature and other elements or features as shown in the figure. It should be understood that the spatial term is intended to include different orientations in use or operation in addition to those described in the drawings of the element. For example, if the element in the drawing is inverted, the element described as "above other elements or structures" or "on other elements or structures" will then be positioned as "below other elements or structures" or "under other elements or structures." Thus, the exemplary term "above" may include two orientations: "above" and "below." The element may also be positioned in other different ways (rotated by 90 degrees or in other orientations) and the spatial relative description used herein is described accordingly.

In addition, it should be noted that the terms "first" and "second" are used to define the parts, which is only for the convenience of distinguishing the corresponding parts. Unless otherwise stated, the above words have no special meaning, so they cannot be understood as limiting the claimed scope of the present disclosure.

The above description is only the preferred embodiment of the present disclosure, and is not intended to limit the present disclosure. For those skilled in the art, the present disclosure may have various changes and variations. Any modification, equivalent replacement, improvement, etc. made within the spirit and principle of the present disclosure shall be included in the claimed scope of the present disclosure.

What is claimed is:

1. A touch frame assembly, comprising:
   a frame body comprises a first frame edge, and the first frame edge comprises an inward concave surface;
   a Printed Circuit Board (PCB) assembly arranged in the frame body, wherein the PCB assembly comprises at least one infrared emission tube and at least one infrared receiving tube;
   a touch screen glass cover plate, located on an inner side of the PCB assembly, wherein the touch screen glass cover plate is configured to receive a touch by a user, the at least one of the infrared emission tube is configured to emit an infrared ray to the infrared receiving tube, an infrared matrix is formed above the touch screen glass cover plate, and in response to receiving the touch, a position of a contact point on the touch screen glass cover plate is determined;

a fixing structure configured to fix the touch screen glass cover plate to the frame body, wherein an inward concave of the touch screen glass cover plate is maintained by a curvature of the inward concave surface; and one or more support pad provided between the touch screen glass cover plate and the frame body, and generating a force that causes the touch screen glass cover plate to be recessed inward, so that the touch screen glass cover plate is recessed inward, wherein the one or more support pad is in a form of a block, and wherein a ratio of a length of the one or more support pad to a length of a first cover plate edge of the touch screen glass cover plate is a, wherein a is between 1/8 to 1/12; or a ratio of a thickness of the support pad to a thickness of the touch screen glass cover plate is b, wherein b is between 1/3 to 1/4.

2. The touch frame assembly according to claim 1, wherein the inward concave surface cooperating with the touch screen glass cover plate, a part of a surface of the touch screen glass cover plate is attached to the inward concave surface, and when the fixing structure fixes the touch screen glass cover plate to the frame body, the touch screen glass cover plate is kept in an inward concave state.

3. The touch frame assembly according to claim 2, wherein the inward concave surface is an arc-shaped concave surface, wherein the frame body further comprises a second frame edge, and the first frame edge is longer than the second frame edge.

4. The touch frame assembly according to claim 3, wherein the arc-shaped concave surface has a symmetrical structure, and wherein a highest point of the arc-shaped concave surface is arranged corresponding to both ends of a first cover plate edge of the touch screen glass cover plate, and a lowest point of the arc-shaped concave surface is arranged corresponding to a midpoint of the first cover plate edge of the touch screen glass cover plate; or the highest point of the arc-shaped concave surface is arranged corresponding to both ends of the first frame edge of the frame body, and the lowest point of the arc-shaped concave surface is arranged corresponding to a midpoint of the first frame edge of the frame body.

5. The touch frame assembly according to claim 3, wherein a height difference between a highest point of the arc-shaped concave surface and a lowest point of the arc-shaped concave surface is H, and the H is between 0.5 mm and 5 mm.

6. The touch frame assembly according to claim 2, wherein an outer contour of the touch screen glass cover plate is rectangular.

7. The touch frame assembly according to claim 6, wherein a first cover plate edge of the touch screen glass cover plate is attached to the inward concave surface.

8. The touch frame assembly according to claim 2, wherein the fixing structure comprises a fixing piece, one end of the fixing piece is pressed on the touch screen glass cover plate, the other end of the fixing piece is fixed on the frame body, so as to keep the touch screen glass cover plate fixed on the frame body; or wherein the fixing structure comprises an adhesive, and the touch screen glass cover plate is adhered to the inward concave surface through the adhesive.

9. The touch frame assembly according to claim 2, wherein the frame body is provided with a first step supporting the touch screen glass cover plate, a part of the surface of the touch screen glass cover plate is abutted against a step surface of the first step, and an end of the touch screen glass cover plate is supported by the first step.

10. The touch frame assembly according to claim 1, wherein the frame body comprises two first frame edges and a curved frame body in each of the two first frame edges and is recessed inward so as to form the inward concave surface, and a thickness of the frame body is kept consistent; or wherein a thickness of a middle portion of each of the two first frame edges of the frame body is greater than that of both ends of each of the two first frame edges of the frame body, so as to form the inward concave surface.

11. The touch frame assembly according to claim 1, wherein the frame body comprises a first mounting groove, and the PCB assembly is arranged in the first mounting groove.

12. The touch frame assembly according to claim 11, wherein a wall of the first mounting groove is provided with a slot and a second step, one end of the PCB assembly is clamped with the slot, and the other end of the PCB assembly is bonded with a step surface of the second step.

13. The touch frame assembly according to claim 11, wherein the touch frame assembly further comprises a filter bar, and the filter bar is mounted on a notch of the first mounting groove.

14. The touch frame assembly according to claim 1, wherein an outer contour of the touch screen glass cover plate is rectangular, and wherein when the number of the one or more support pad is two, each of the two support pads is arranged at a midpoint of each of two first cover plate edges of the touch screen glass cover plate; and when the number of the one or more support pad is more than two, the support pads are evenly arranged along the two first cover plate edges of the tough screen glass cover plate at intervals.

15. The touch frame assembly according to claim 1, wherein the fixing structure comprises a fixing piece, one end of the fixing piece is pressed on the touch screen glass cover plate, the other end of the fixing piece is fixed on the frame body, so as to keep the touch screen glass cover plate fixed on the frame body.

16. The touch frame assembly according to claim 1, wherein the support pad is adhered to the frame body.

17. The touch frame assembly according to claim 1, wherein a material of the support pad is plastic or foam.

18. An interactive white board, comprising:

a backlight module; and a touch frame assembly, wherein the touch frame assembly comprises:

a frame body comprises a first frame edge, and the first frame edge comprises an inward concave surface;

a Printed Circuit Board (PCB) assembly arranged in the frame body, wherein the PCB assembly comprises at least one infrared emission tube and at least one infrared receiving tube;

a touch screen glass cover plate, located on an inner side of the PCB assembly, wherein the touch screen glass cover plate is configured to receive a touch by a user, the at least one infrared emission tube is configured to emit an infrared ray to the infrared receiving tube, an infrared matrix is formed above the touch screen glass cover plate, and in response to receiving the touch, a position of a contact point on the touch screen glass cover plate is determined;

a fixing structure configured to fix the touch screen glass cover plate to the frame body, wherein an inward concave of the touch screen glass cover plate is maintained by a curvature of the inward concave surface; and one or more support pad provided between the touch screen glass cover plate and the frame body, and generating a force that causes the touch screen glass cover plate to be recessed inward, so that the touch screen glass cover plate is recessed inward, wherein the one or more support pad is in a form of a block, wherein
- a ratio of a length of the one or more support pad to a length of a first cover plate edge of the touch screen glass cover plate is a, wherein a is between 1/8 to 1/12; or
- a ratio of a thickness of the support pad to a thickness of the touch screen glass cover plate is b, wherein b is between 1/3 to 1/4, and wherein the backlight module is arranged on an inner side of the touch frame assembly.

* * * * *